(12) United States Patent
Moon (10) Patent No.: US 6,888,804 B1
(45) Date of Patent: May 3, 2005

(54) APPARATUS AND METHOD FOR INSERTING SIDE INFORMATION IN COMMUNICATION SYSTEM

(75) Inventor: Hi-Chan Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/273,801

(22) Filed: Mar. 19, 1999

(30) Foreign Application Priority Data

Mar. 19, 1998 (KR) .............................................. 98/9474

(51) Int. Cl.$^7$ ............................................. H04B 7/216
(52) U.S. Cl. ...................... 370/311; 370/335; 370/342; 370/441
(58) Field of Search ................................. 370/310, 311, 370/328, 335, 342, 441, 479, 522, 523, 527, 528

(56) References Cited

U.S. PATENT DOCUMENTS

| | | | | |
|---|---|---|---|---|
| 5,461,639 A | * | 10/1995 | Wheatley et al. | ........... 370/342 |
| 5,691,992 A | * | 11/1997 | Molnar et al. | .............. 714/752 |
| 5,703,902 A | * | 12/1997 | Ziv et al. | ..................... 375/228 |
| 5,751,763 A | * | 5/1998 | Bruckert | ..................... 375/141 |
| 5,883,899 A | * | 3/1999 | Dahlman et al. | ........... 370/468 |
| 5,896,411 A | * | 4/1999 | Ali et al. | ..................... 375/130 |
| 6,084,904 A | * | 7/2000 | Wang et al. | ................. 375/130 |
| 6,097,716 A | * | 8/2000 | Abrishamkar | ............... 370/342 |
| 6,307,849 B1 | * | 10/2001 | Tiedemann, Jr. | ............ 370/335 |
| 6,366,778 B1 | * | 4/2002 | Bender et al. | .............. 455/442 |
| 6,396,867 B1 | * | 5/2002 | Tiedemann et al. | ......... 375/141 |

* cited by examiner

*Primary Examiner*—John Pezzlo
*Assistant Examiner*—Ahmed Elallam
(74) *Attorney, Agent, or Firm*—Dilworth & Barrese LLP (57) ABSTRACT

An apparatus and method for inserting side information in a communication system. The apparatus includes a channel encoder for encoding input data in a frame unit to generate encoded data symbols, a side information generator for generating the side information, a selector for generating a select control signal designating a position into which the side information is inserted, a side information inserter for inserting the side information between the encoded data symbols in response to the select control signal, and a spreader for spreading the output of the side information inserter.

38 Claims, 8 Drawing Sheets

APPARATUS AND METHOD FOR INSERTING SIDE INFORMATION IN COMMUNICATION SYSTEM

CLAIM OF PRIORITY

This application makes reference to, incorporates the same herein, and claims all benefits accruing under 35 U.S.C. §119 from an application entitled *APPARATUS AND METHOD FOR INSERTING SIDE INFORMATION IN COMMUNICATION SYSTEM* earlier filed in the Korean Industrial Property Office on 19, Mar. 1998, and their duly assigned Serial No. 98-9474.

BACKGROUND OF THE INVENTION

1. Field of the Invention

The present invention relates generally to communication systems, and more particularly, to a channel communication apparatus and method for inserting side information in a communication system.

2. Description of the Related Art

In general, voice data and messaging information may be transmitted over a traffic channel. In particular, the forward traffic channel is used to transmit user data, voice and signaling messages. For example, in addition to transmitting data, a channel transmitter of a forward link will transmit side information such as power control information. A channel receiver separates the data and side information from the received information. For efficient reverse transmission power control, the power control command is transmitted without channel encoding and should be delivered within a short delay. In this case, power control commands transmitted from the transmitter should be demodulated within a short delay. Hereinafter, for ease of explanation, it will be assumed that the side information is a power control bit and the communication system is a CDMA (Code Division Multiple Access) communication system.

Since the power control bit is not encoded, the channel transmitter should transmit it with a power different from that of other data. As a result, the spectrum characteristic may deteriorate because of the disparity in power levels between the data and the power control bit. Therefore, the position of the power control bit to be transmitted is randomly changed. Changing the position of the power control bit requires that coded data to be transmitted is randomly punctured to allow the power control bit to be inserted into the punctured position, thereby degrading channel encoded data.

Figure 1:
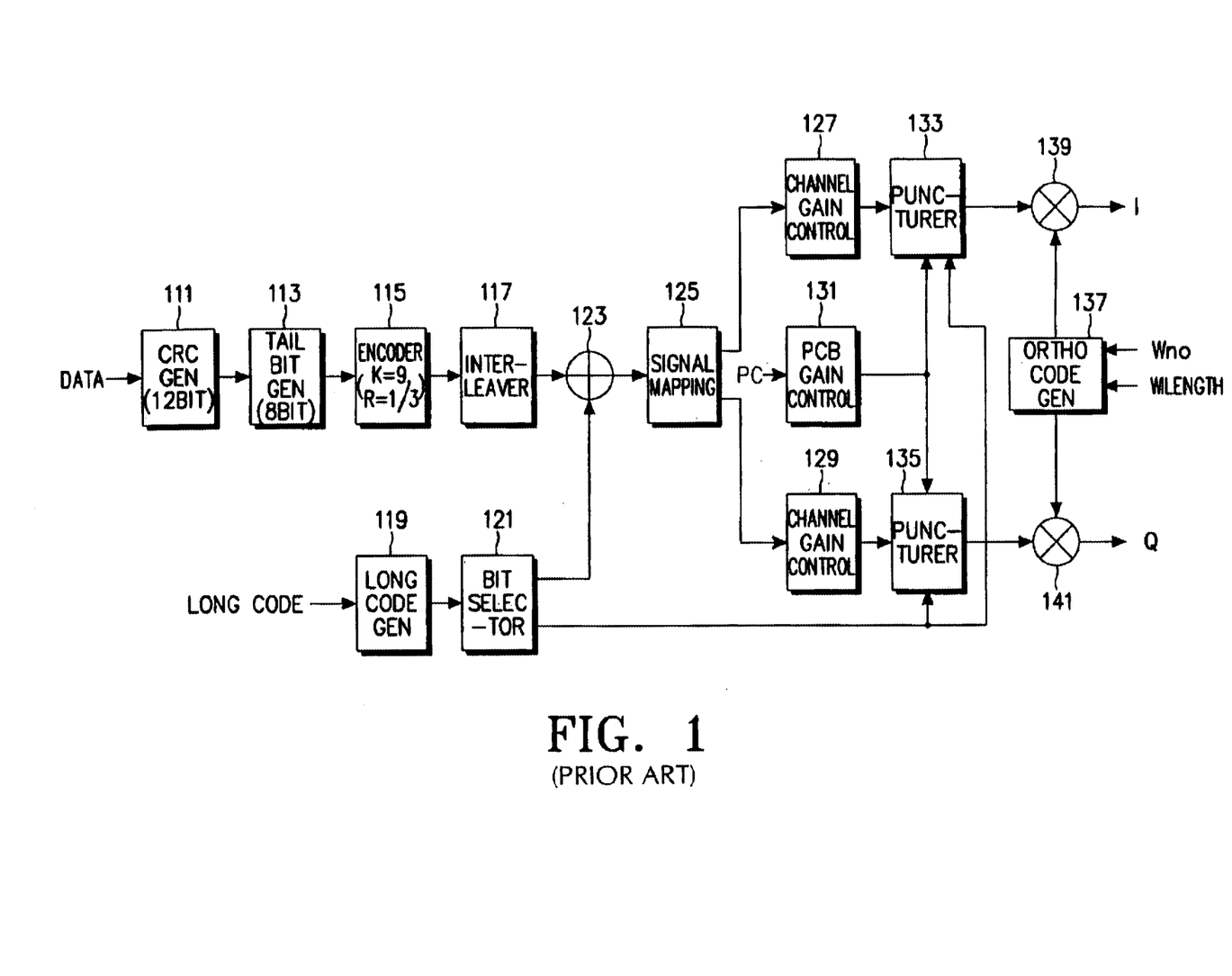
FIG. 1 is a block diagram of a conventional channel transmitter in a CDMA communication system.

FIG. 1 illustrates a fundamental channel transmitter of a base station of a CDMA communication system in accordance with the prior art. In operation, a cyclic redundancy check (CRC) generator 111 adds a 12-bit CRC to data to be transmitted. A tail bit generator 113 adds an additional eight tail bits to the CRC added data so that an encoder 115 can initialize the data as a frame unit. For example, if data having a bit length of 172 bits is input to the CRC generator 111, data generated from the tail bit generator 113 is 192 bits. That is, the 192 bits output from the tail bit generator represent the sum of the original 172 data bits plus 12 bits of CRC and an additional 8 bits generated in the tail bit generator. The encoder 115 encodes the 192 bits received from the tail bit generator 113 to generate 576 symbols per frame. An interleaver 117 interleaves the encoded data generated from the encoder 115.

A bit selector 121 decimates a long code generated from a long code generator 119 to equalize the symbol rate between the long code and the interleaved data. An XOR (Exclusive OR) gate 123 generates a scrambled signal by XORing the interleaved data with the decimated long code. A signal mapping 125 demultiplexes the output of the XOR 123 to generate odd data as a first channel (I channel) signal and even data as a second channel (Q channel) signal, and changes the generated signal "0" to "+1" and "1" to "−1". The channel signals generated from the signal mapping 125 are supplied to first and second data channel gain controllers 127 and 129 where their gains are controlled.

A power control (PC) bit is applied to a PC gain controller 131 where the gain controlled PC bit applied to first and second puncturers 133 and 135. The puncturers 133 and 135 puncture data situated at a position designated by a control signal generated from the bit selector 121 and insert the gain controlled PC bit outputted from the PC gain controller 131 into the punctured position. The outputs of the puncturers 133 and 135 are supplied to first and second multipliers 139 and 141 where they are multiplied by an orthogonal code generated from an orthogonal code generator 137 and then transmitted as orthogonally modulated signals.

The existing IS-95 standard uses 20 ms frames each having 16 1.25 ms power control groups. One power control bit is inserted into each power control group after data puncturing. The insert position is determined by the 4 least significant bits of a long code generated for the previous power control group duration.

Figure 2:
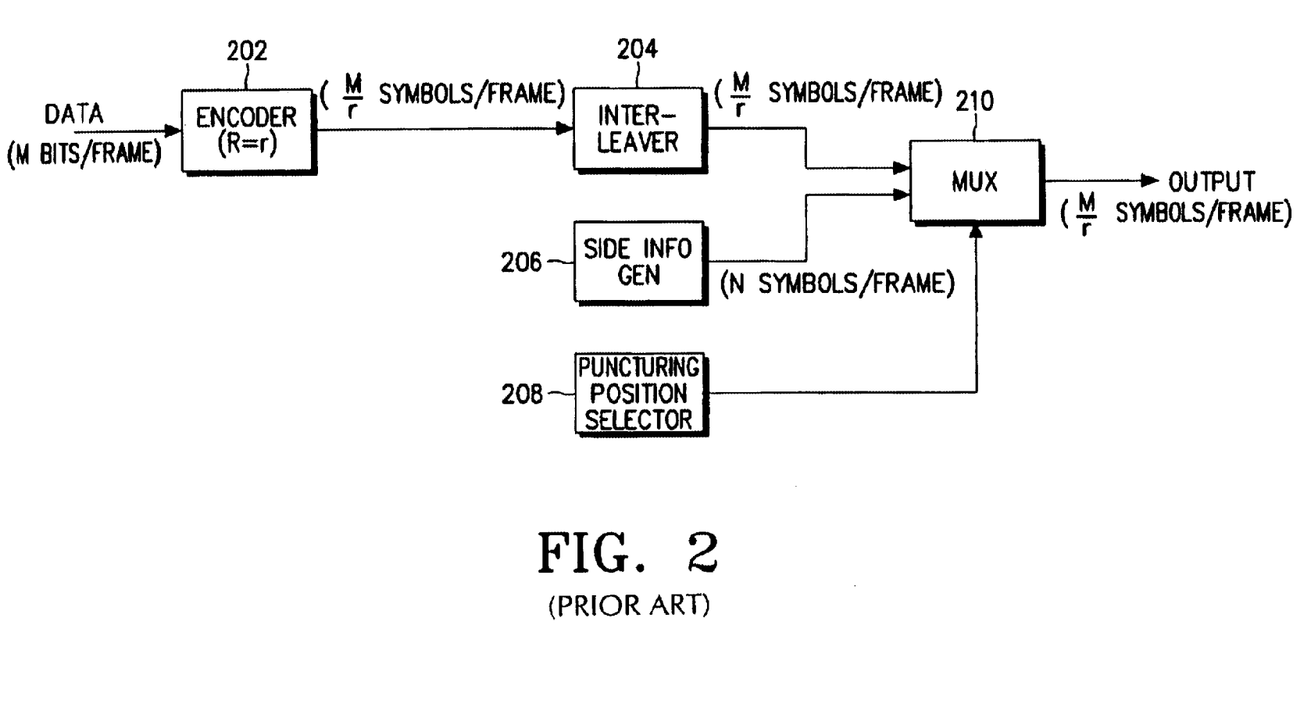
FIG. 2 is a block diagram of a structure for inserting side information in the channel transmitter of FIG. 1.

FIG. 2 illustrates a block diagram of a structure for inserting the side information in the fundamental channel transmitter of FIG. 1.

Referring to FIG. 2, if input data is M bits per frame and a coding rate of an encoder 202 is r, (M/r) symbols per frame are generated from the encoder 202. A side information generator 206 generates N symbols per frame as side information. A puncturing position selector 208 generates a select control signal designating a position into which the side information is inserted. A multiplexer (MUX) 210 punctures a symbol, among the symbols generated from an interleaver 204 situated at the position designated by the select control signal and inserts the side information into the punctured position.

In operation, the input data of M bits/frame is encoded in the encoder 202 whose coding rate is r and output as data of (M/r) symbols per frame. The encoded data is interleaved in the interleaver 204 and then supplied to the MUX 210. The side information of N symbols per frame generated from the side information generator 206 is also supplied to the MUX 210. The puncturing position selector 208 generates the select control signal for selecting one of the two MUX 210 inputs. If the select control signal is sourced from the puncturing position selector 208, the MUX 210 outputs the side information, otherwise the MUX 210 outputs the encoded data output from the interleaver 204.

Figure 3:
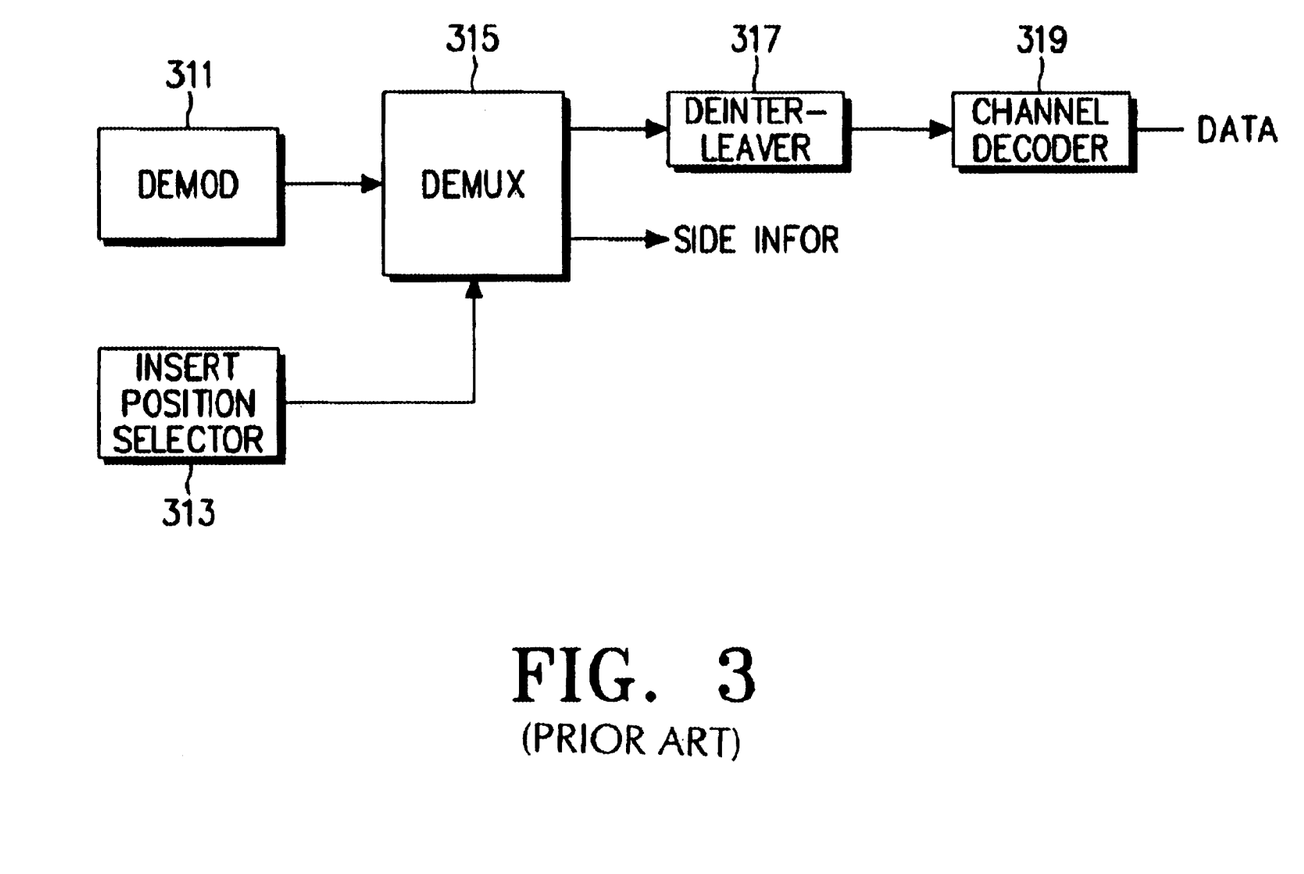
FIG. 3 is a block diagram of a conventional channel receiver in a CDMA communication system.

FIG. 3 is a block diagram of a fundamental channel receiver for extracting the side information from the received data.

A demodulator 311 demodulates the received channel data. An inserting position selector 313 generates a select control signal designating a position into which the power control bit is inserted. A demultiplexer (DEMUX) 315 extracts data symbols from the demodulator 311 output. The extracted data symbols are supplied to a deinterleaver 317. The extracted side information is supplied to a processor for processing the side information (e.g., the power control bit)

for reverse channel transmission power control. The deinterleaver 317 deinterleaves the symbols generated from the DEMUX 315. A channel decoder 319 decodes the deinterleaved data symbols to convert them into original data. The converted data is supplied to a signal processor.

In the power control bit inserting method described above, the interleaved data symbols are randomly punctured. As a result, the performance of the channel code is degraded in comparison with that of a systematically punctured code.

SUMMARY OF THE INVENTION

It is therefore an object of the present invention to provide an apparatus and method for inserting side information in a channel of a CDMA communication system.

It is another object of the present invention to provide an apparatus and method for inserting side information so as to minimize the degradation of a channel in a CDMA communication system.

It is still another object of the present invention to provide a channel transmitting apparatus and method for inserting side information into a prescribed position after puncturing encoded data symbols by the number of symbols of side information and interleaving the punctured data in a CDMA communication system.

It is a further object of the present invention to provide an apparatus and method for receiving a side information inserted signal transmitted after symbols are punctured and then interleaved so as to minimize the degradation of a channel in a CDMA communication system.

To achieve these objects of the present invention, there is provided an apparatus for preventing the loss of a channel code which may occur by randomly puncturing interleaved symbols. A selector of this apparatus generates a select control signal for designating the positions of symbols into which side information is inserted. A side information inserter inserts the side information such as a power control bit between the interleaved symbol sequence in response to the select control signal. A channel encoder includes an encoder and includes a puncturer for puncturing data symbols encoded by the encoder in consideration of the number of symbols of the side information. Thus, the inventive apparatus punctures only the symbols which can minimize the degradation of a channel among the encoded data symbols, interleaves the punctured symbols and then inserts the side information between the interleaved symbols, thereby minimizing the loss of the channel code in comparison with the case that the interleaved data symbols are randomly punctured and the power control bit is inserted into the punctured positions.

In accordance with another aspect of the present invention, a channel transmitter of a communication system includes: a CRC generator for adding a CRC bit to input data in a frame unit; a tail bit generator for adding a tail bit to the output of the CRC generator; an encoder for encoding the output of the tail bit generator at a preset coding rate; a puncturer for puncturing symbols of a prescribed number of output symbols of the encoder; an interleaver for interleaving the output of the puncturer; a selector for generating select control signals randomly designating position into which side information are inserted; a side information inserter for inserting the side information between the output symbols of the interleaver in response to the select control signal; and an orthogonal modulator for orthogonally modulating the output of the side information inserter.

In accordance with still another aspect of the present invention, a transceiver of a mobile communication system includes: a channel encoder for encoding input data to generate encoded data symbol sequence; a puncturer for puncturing a number of the encoded data symbol sequence; an interleaver for interleaving the punctured data symbol sequence; a side information generator for generating the side information; a selector for generating a select control signal designating a position into which the side information is inserted; a side information inserter for inserting the side information between the interleaved data symbol sequence in response to the select control signal; a transmitter for spreading the data symbol sequence having the side information to transmit the spread signal; and a receiver for receiving the spread signal from the transmitter, wherein the receiver includes at least one finger for despreading the spread signal to generate a receiving signal sequence, an inserting position selector for generating a control signal designating a position into which the side information is inserted, and a demultiplexer for extracting the side information contained in the receiving signal sequence in response to the control signal generated from the inserting position selector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings.

Figure 4:
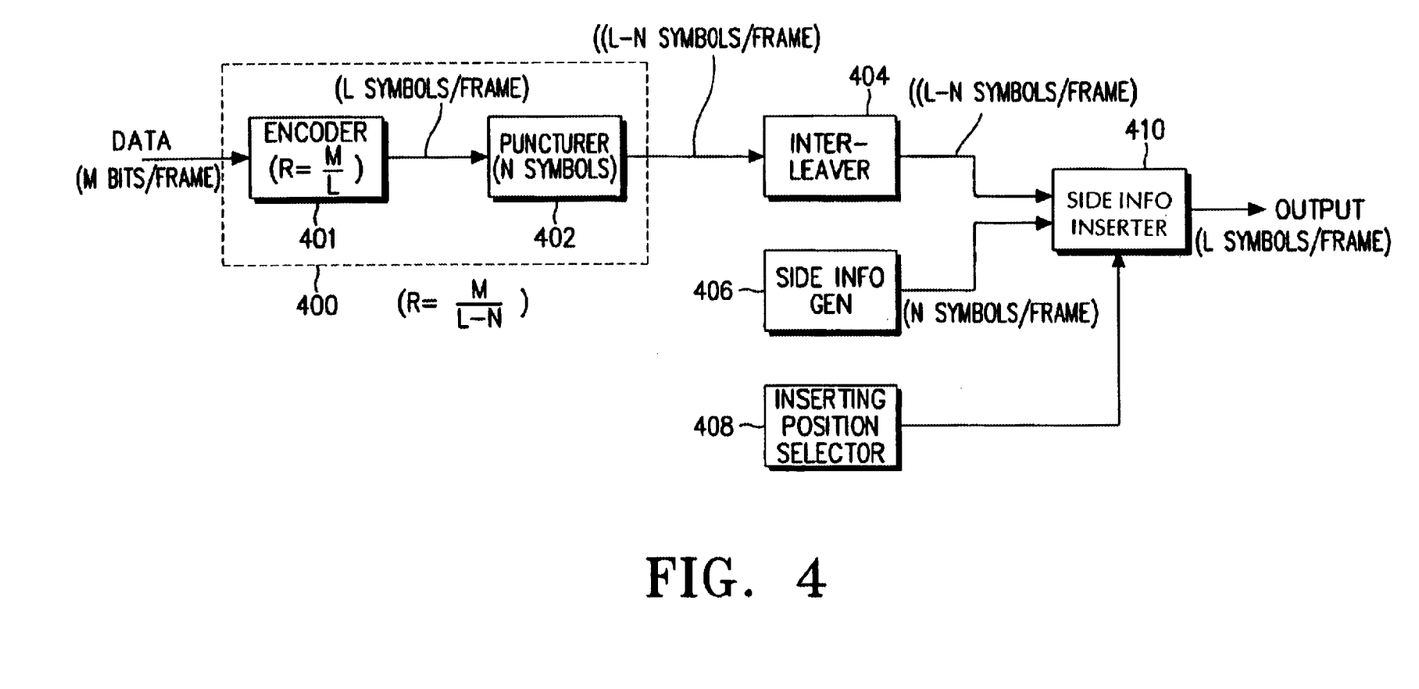
FIG. 4 is a block diagram of a structure for inserting side information in channel data of a CDMA communication system according to the present invention.

FIG. 4 is a block diagram of a structure for inserting side information in a channel of a CDMA communication system according to the present invention. In FIG. 4, it is assumed that one-frame of data consists of M bits, the coding rate R is M/L, the number of symbols to be punctured is N symbols per frame, and a corresponding number of side information bits to be inserted is N symbols per frame.

An encoder 401 whose coding rate is M/L encodes input data of M bits per frame to generate L symbols per frame. A puncturer 402 systematically punctures symbols among the N encoded symbols so as to minimize the channel degradation. For example, encoded symbols related to a single information bit are never punctured more than once. In other words, no more than one encoded symbol will be punctured from a group of encoded symbols related to a single information bit. The puncturer 402 causes a following block to insert side information and punctures symbols which have the least influence on demodulation of the encoded data by a receiver. The number of symbols to be punctured by the puncturer 402 is equal to or greater than the number of symbols of side information. In the preferred embodiment of the present invention, the number of symbols to be punctured is N. The encoder 401 and the puncturer 402 constitute a channel encoder 400. In contrast with the prior art, where interleaved encoded data symbols are randomly punctured, the present invention systematically punctures data symbols prior to interleaving.

An interleaver 404 interleaves the systematically punctured data symbols generated from the channel encoder 400. A side information generator 406 generates side information of N symbols per frame. An inserting position selector 408 generates a select control signal for determining a position where the side information generated from the side information generator 406 is inserted. A side information inserter 410 selects either the output of the interleaver 404 or the output of the side information generator 406 as determined by the presence or absence of the select control signal. That is, if the select control signal is not generated, the side information inserter 410 selects the interleaver 404 output. Otherwise, if the select control signal is generated, the side information inserter 410 selects the side information generator 406 output. In the latter case, the side information inserter 410 delays the output of the interleaver 404. Therefore, the delayed symbols are sequentially generated if the select control signal is not generated. This is different from the conventional method in which symbols are punctured and side information is simultaneously inserted.

Figure 5A:
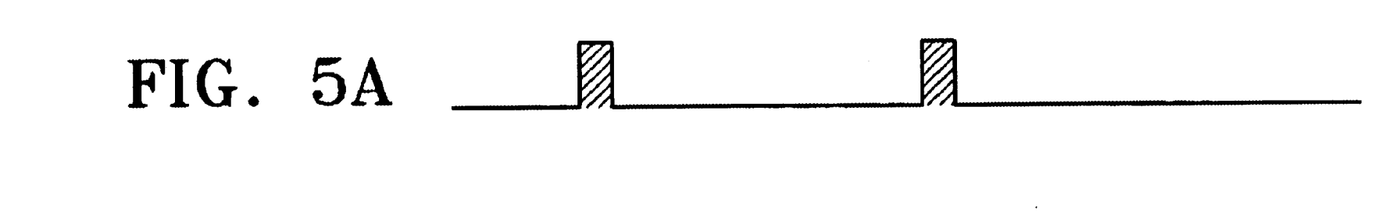
FIGS. 5A to 5C are diagrams for comparing the side information inserting operation of the present invention with the conventional side information inserting operation.
Figure 5B:
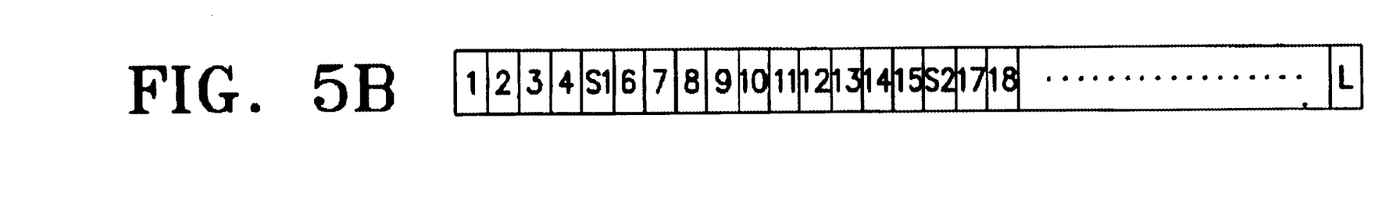
Figure 5C:
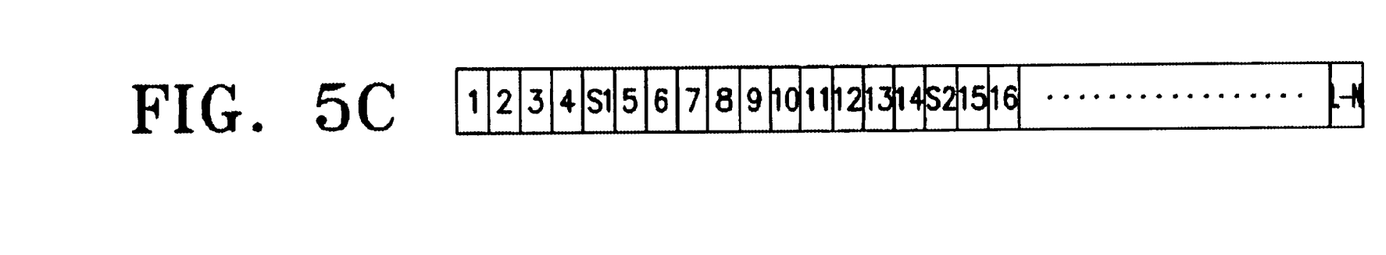

FIGS. 5A to 5C are diagrams for comparing the side information inserting operating of the present invention with the conventional side information inserting operation.

Referring to FIGS. 4 and 5A–5C, the input data of M bits per frame applied to the encoder 401 includes the CRC bits and the tail bits. The encoder 401 encodes the M-bit frame data at a coding rate R. If the coding rate R is assumed to be M/L, L symbols are generated from the encoder 401. N symbols among the L symbols generated from the encoder 401 are punctured by the puncturer 402, N being equal to the number of symbols of side information to be inserted. Therefore, (L–N) symbols are generated from the puncturer 402. The puncturer 402 punctures only symbols which can minimize the degradation of the channel during transmission according to a preset rule. The interleaver 404 interleaves the (L–N) symbols generated from the puncturer 402.

The side information generator 406 generates side information of N symbols per frame. The side information may, for example, be a power control command or information representing whether a channel is being used, or information indicating channel quality. The inserting position selector 408 generates the select control signal for designating a position into which the side information is inserted in a frame unit. The side information inserter 410 receives the outputs of the interleaver 404 and the side information generator 406 inserts the side information into the output of the interleaver 404 in response to the output of the inserting position selector 408. At the interval during which the select control signal is not generated, the side information inserter 410 generates the output of the interleaver 404. At the interval during which the select control signal is generated as shown in FIG. 5A, the side information inserter 410 generates the side information as shown in FIG. 5B with the output of the interleaver 404 delayed.

Thus, the inserting position selector 418 selects the position into which the side information is inserted. The side information may be periodically inserted at regular intervals or pseudo-randomly inserted. That is, the inserting position selector 408 may generate the select control signal for pseudo-randomly designating a position into which the side information is inserted or generate the select control signal for periodically designating that position at regular intervals.

As described, in accordance with the teachings of the present invention, encoded data symbols are first punctured before they are interleaved, and then the side information comprising N symbols are inserted between the (L–N) symbols generated from the interleaver 404 as illustrated in FIG. 5C. L symbols per frame are generated from the side information inserter 410. That is, the side information inserting operation of the present invention differs from the conventional operation where interleaved symbols are punctured and the power control bits are inserted into the punctured positions as shown in FIG. 5B.

In an alternate embodiment, the encoder 401 and the puncturer 402 may be replaced by one channel encoder with a coding rate of M/(L–N). That is, the coding rate of the channel encoder may be adjusted by encoding the input data to have a given coding rate in consideration of the side information, N, to be inserted per frame.

In another embodiment, the number of bits of input data may be reduced in consideration of the side information to be inserted. Thereafter, the input data is encoded and then interleaved to insert the side information.

Figure 6:
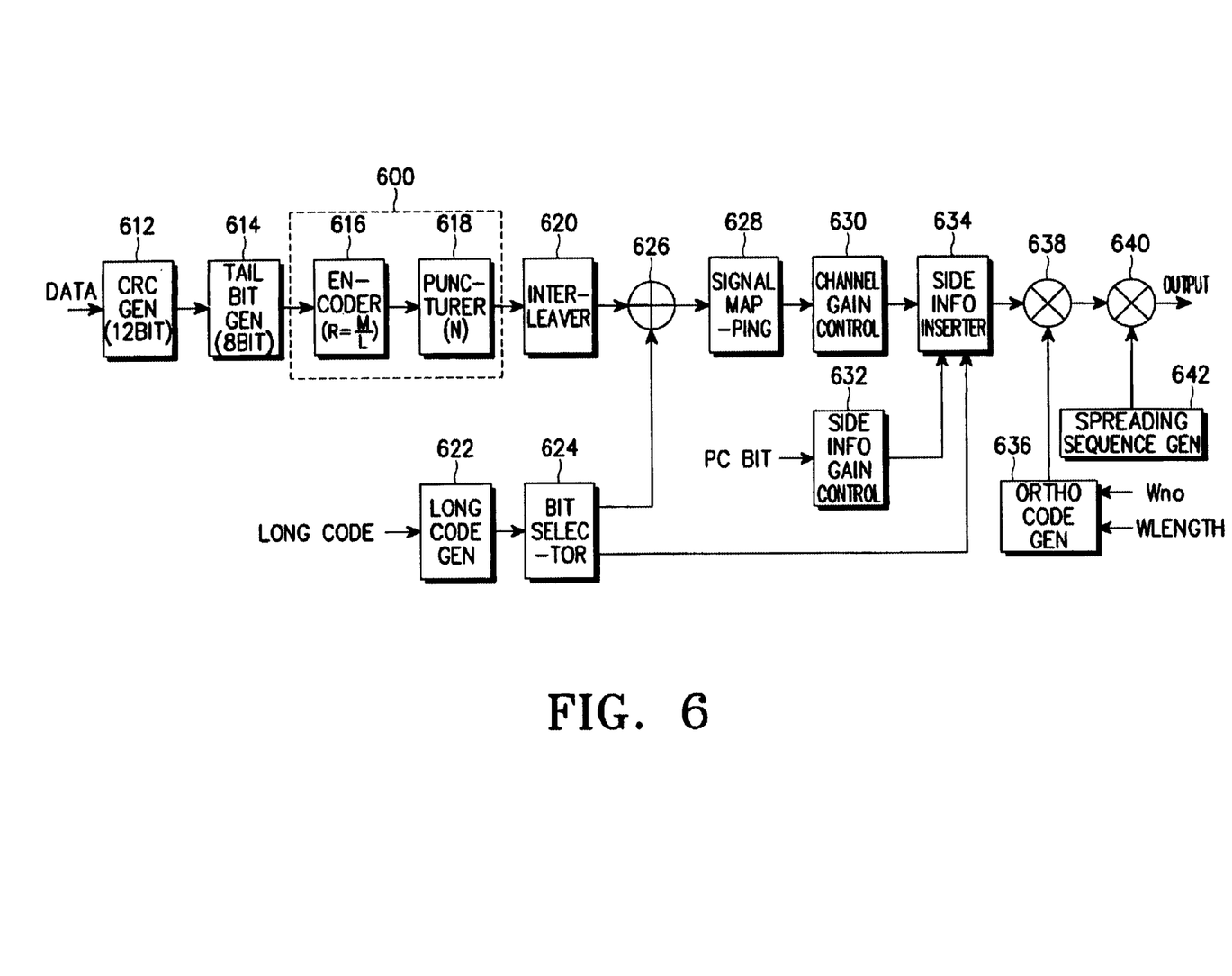
FIG. 6 is a block diagram of a channel transmitter using BPSK modulation in a CDMA communication system according to the present invention.

FIG. 6 illustrates a channel transmitter using BPSK (Binary Phase Shift Keying) modulation.

A CRC generator 612 generates a CRC bit to add it to a received frame of data. A tail bit generator 614 connected to receive the output of the CRC generator 612 generates a tail bit representing the end of a frame of data. The tail bit is added to the CRC added data. The tail bit is used for terminating the encoding of an encoder 616. It is assumed that the frame data (input data+CRC bit+tail bit) generated from the tail bit generator 614 is M bits per frame.

Upon detecting the tail bit, the encoder 616 encodes the single frame of data generated from the tail bit generator 614. The encoder 616 may use a convolutional encoder or a turbo encoder. In a preferred embodiment of the present invention, the encoder 616 has a coding rate R (=M/L), L being the number of final output symbols. That is, L symbols per frame are generated from the encoder 616. A puncturer 618 punctures N symbols out of the L symbols generated from the encoder 616. Therefore, (L–N) symbols per frame are generated from the puncturer 618. An interleaver 620 interleaves the output of the puncturer 618. The interleaver 620 may use a block interleaver. The number of symbols generated from the interleaver is (L–N).

A long code generator 622 generates a long code which is a unique identity code unique to each subscriber. A bit selector 624 decimates the long code to be equal in symbol rate to the output of the interleaver 620 and simultaneously generates a select signal determining a position into which the side information is inserted. It is assumed for the purposes of illustration that the side information is a power control (PC) bit. An XOR gate 626 generates an XORed signal between the output of the interleaver 620 and the output of the bit selector 624.

A signal mapping 628 demultiplexes the output of the XOR 626 to generate first and second channel signals and simultaneously changes the output level of the XOR 626, that is, "0" to "+1" and "1" to "−1".

A data channel gain controller 630 controls the gain of the channel signal generated from the signal mapping 628 by a gain control signal. A side information gain controller 632 controls the gain of the side information by a gain control signal. If the side information is a power control bit, for example, it may be generated as "+1" or "−1" in order to increase or decrease the transmission power of a terminal. A side information inserter 634 output of the data channel gain controller 630 inserts the side information outputted from the side information gain controller 632 at preset intervals while generating the channel signal by the output of the bit selector 624. The side information inserter 634 inserts the side information into the channel signal at every side information position. Therefore, the side information inserter 634 generates L symbols per frame.

An orthogonal code generator 636 generates an orthogonal code in response to an orthogonal code number Wno and an orthogonal code length Wlength. The orthogonal code may use a Walsh code or a quasi-orthogonal code. A first multiplier 638 generates an orthogonal modulated signal by multiplying the channel signal generated from the side information inserter 634 by the orthogonal code. A second multiplier 640 generates a spread signal by multiplying the orthogonal modulated signal by a spread sequence generated from a spreading sequence generator 642.

In the illustrative embodiment described above, it is assumed that the input data is 172 bits per frame, the CRC bit is 12 bits, and the tail bit is 8 bits. Therefore, the M-bit data applied to the encoder is 192 bits. It is also assumed that the encoder 616 has a coding rate 1/3 (M=192, L=576), and the side information is 32 bits (N=32).

In operation, the CRC generator 612 adds 12 CRC bits to the input data of 172 bits so that a receiver can judge the quality of the frame. The frame data generated from the CRC generator 612 is applied to the tail bit generator 614 where 8 tail bits are added. The tail bit is for representing the end of the current frame and terminates the encoding of the encoder 616.

Assuming that the encoder 616 uses a convolutional encoder having a constraint length k (=9) and a coding rate 1/3 (M=192 and L=576), it encodes 192-bit data per frame and generates 576 symbols per frame. The puncturer 618 punctures N symbols out of the L symbols generated from the encoder 616 to generate (L−N) symbols. The punctured symbols may be equal in number to the symbols of side information to be inserted so as to minimize the loss of channel code. Assuming that the number of punctured symbols is 32, the number of symbols generated from the puncturer 618 is 544 (=L−N=576−32). The encoder 616 and the puncturer 618 may constitute one channel encoder 600. In this case, the coding rate R of the channel encoder 600 is M/(L−N)=192/(576−32).

The interleaver 620 changes the bit arrangement of the punctured symbols generated from the puncturer 618 to improve the tolerance to burst error. The long code generator 622 generates a long code which is a unique identity code assigned to each user and implements a function for scrambling user information. The bit selector 624 decimates the long code to be equal in symbol rate to the output of the interleaver 620. The XOR gate 626 generates a scrambled signal by XORing the outputs of the interleaver 620 and the bit selector 624.

The signal mapping 628 changes the level of the symbols generated from the XOR 626, that is, "0" to "+1" and "1" to "−1". The data channel gain controller 630 which is a data channel gain adder adds a power control gain to the input signal. The side information channel gain controller 632 controls the gain of the side information. The side information may, for example, be the power control bit. That is, data channel and side information channel gains are controlled by the data channel gain controller 630 and the side information channel controller 632 respectively, because they may be different.

The side information inserter 634 receiving the output of the data channel gain controller 630 and the side information channel gain controller 632 selectively generates the inputs by the output of the bit selector 624. Namely, at a position into which side information is not inserted, the side information inserter 634 generates a data symbol generated from the data channel gain controller 630. At a position into which the side information is inserted, the side information inserter 634 inserts side information outputted from the side information channel gain controller 632. In the latter case, the symbols generated from the data channel gain controller 630 are in a stand-by state while the side information is being inserted. After the side information is inserted, the symbols which are in a stand-by state are generated. Since the symbols of the side information corresponding to the number of the punctured symbols are inserted, the number of symbols generated from the side information inserter 634 is the same as the number L (=576) of symbols generated from the encoder 616.

It will be appreciated that the encoded symbols are not eliminated, rather the side information is inserted between the encoded symbols when the side information inserter 634 inserts the side information. Therefore, the loss of the channel code can be minimized. Moreover, the bit selector 624 generates the position select signal to insert the side information between the symbols generated from the interleaver 620. The position into which the side information is inserted may be periodically determined to be selected at regular intervals or may be pseudo-randomly inserted. In the preferred embodiment of the present invention, the side information is pseudo-randomly inserted. One method of pseudo-randomly inserting side information is by selecting the 4 least bits of the long code of previous power control group.

The orthogonal code generator 636 generates the orthogonal code in response to the orthogonal code number Wno and the orthogonal code length Wlength. The first multiplier 638 generates the orthogonal modulated signal by multiplying the symbols generated from the side information inserter 634 by the orthogonal code. The orthogonal code used in the channel transmitter may be a Walsh code or a quasi-orthogonal code.

It should be noted that the side information inserting method of the present invention may be applicable to all the channel transmitters of the CDMA communication system.

Figure 7:
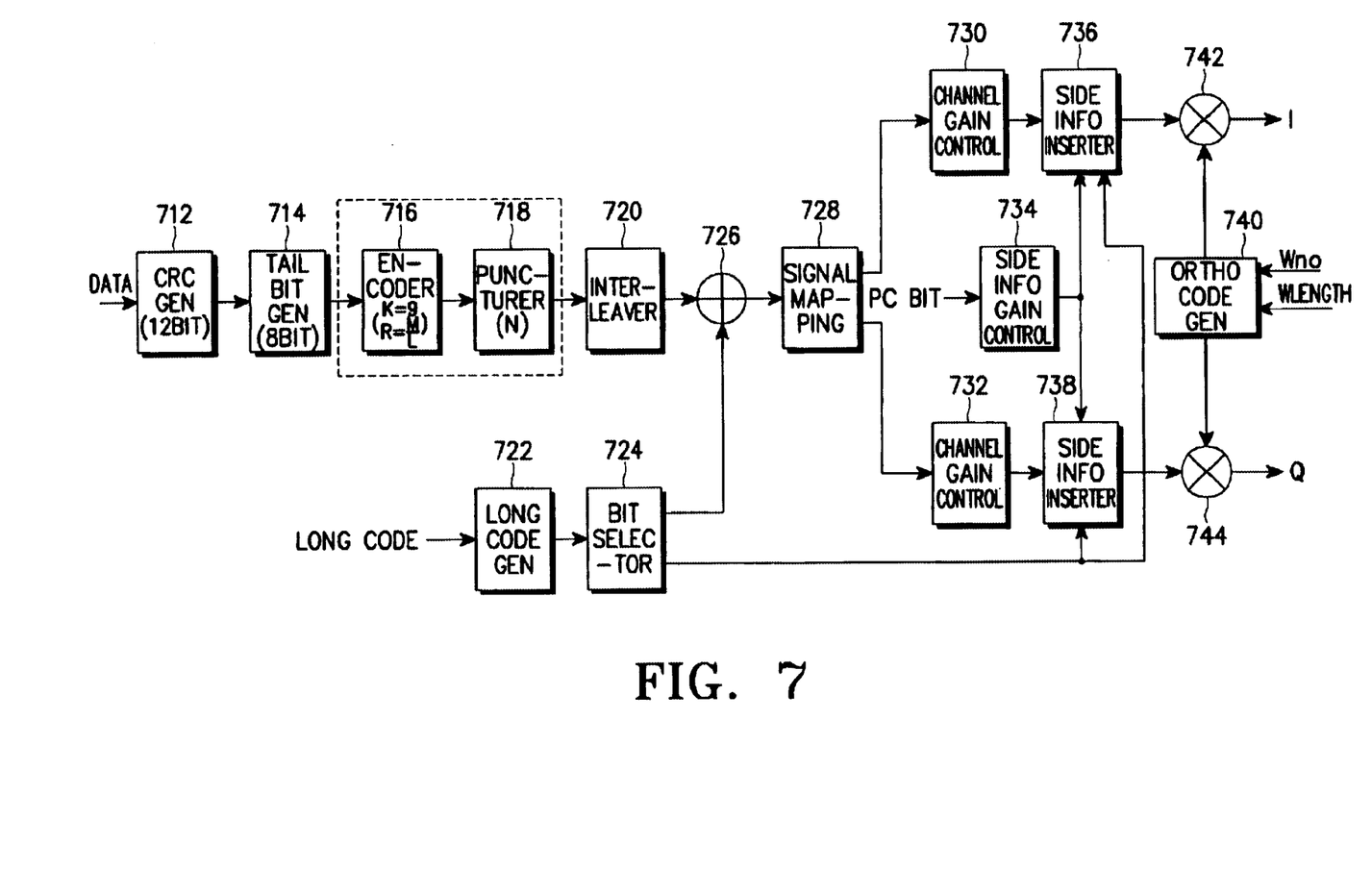
FIG. 7 is a block diagram of a channel transmitter using QPSK modulation in a CDMA communication system according to the present invention.

FIG. 7 is a block diagram of a channel transmitter using QPSK (Quadrature Phase Shift Keying) modulation in the CDMA communication system.

A CRC generator 712 generates a CRC bit to add it to received frame data. A tail bit generator 714 connected to receive the output of the CRC generator 712 generates a tail bit representing the end of one-frame data to add it to the frame data. The tail bit is used for initializing the encoding of an encoder 716. It is assumed that the frame data (input data+CRC bit+tail bit) generated from the tail bit generator 714 is M bits per frame.

Upon detecting the tail bit, the encoder 716 encodes one-frame of data generated from the tail bit generator 714. The encoder 716 may use a convolutional encoder or a turbo encoder. In the preferred embodiment of the present invention, the encoder 716 has a coding rate R (=M/L), L being the number of final output symbols. That is, L symbols per frame are generated from the encoder 716. A puncturer 718 punctures N symbols out of the L symbols generated from the encoder 716. Therefore, (L−N) symbols per frame are generated from the puncturer 718. An interleaver 720 interleaves the output of the puncturer 718. The interleaver 720 may use a block interleaver. The number of symbols generated from the interleaver is (L−N).

A long code generator 722 generates a long code which is a unique identity code for each subscriber. A bit selector 724 decimates the long code to be equal to the output of the interleaver 720 in symbol rate and simultaneously generates a select signal determining a position into which the side information is to be inserted. It is assumed that the side information is a power control bit. An XOR gate 726 generates an XORed signal between the output of the interleaver 720 and the output of the bit selector 724.

A signal mapping 728 demultiplexes the output of the XOR 726 to generate odd data as a first channel (I channel) signal and even data as a second channel (Q channel) signal, and changes the output level of the XOR 726, that is, "0" to "+1" and "1" to "−1". The first channel signal generated from the signal mapping 728 is applied to a first data channel gain controller 730 where its gain is controlled by a gain control signal. The second channel signal generated from the signal mapping 728 is applied to a second data channel gain controller 732 where its gain is controlled by a gain control signal. A side information gain controller 734 controls the gain of a power control bit applied thereto by a gain control signal. The data channel gains are controlled by the data channel gain controllers 730 and 732. If the side information is assumed to be a power control bit, it is generated as "+1" or "−1" in order to increase or decrease the transmission power of the terminal.

A first side information inserter 736 inserts the side information generated from the side information gain controller 734 at preset intervals while the first channel signal is generated from the data channel gain controller 703 by the output of the bit selector 724. A second side information inserter 738 inserts the power control bit generated from the side information gain controller 734 at preset intervals while the second channel signal is generated from the data channel gain controller 732 by the output of the bit selector 724. Therefore, the side information inserters 736 and 738 insert the control bit into the corresponding channel signal at every set position.

An orthogonal code generator 740 generates an orthogonal code in response to an orthogonal code number Wno and an orthogonal code length Wlength. The orthogonal code may use a Walsh code or a quasi-orthogonal code. A first multiplier 742 generates a first orthogonal modulated channel signal by multiplying the first channel signal generated from the first side information inserter 736 by the orthogonal code. A second multiplier 744 generates a second orthogonal modulated channel signal by multiplying the second channel signal generated from the second side information inserter 738 by the orthogonal code.

The above channel transmitter using the QPSK modulation inserts the side information in a similar way to the transmitter using the BPSK modulation shown in FIG. 6.

The channel code used in the channel encoder consisting of the encoder and the puncturer in order to insert the side information may use a convolutional code, a turbo code or a linear block code. The channel encoder may encode the input data at the coding rate of M/(L−N). Alternatively, the input data may be encoded at the coding rate of M/L, and N symbols among the encoded symbols may be punctured in order to obtain the same result.

The interleaved symbols are not eliminated but the side information is inserted between the encoded symbols when the side information is inserted. Therefore, the loss of the channel code can be minimized. The position into which the side information is inserted may periodically be selected at regular intervals or may pseudo-randomly be changed.

Figure 8:
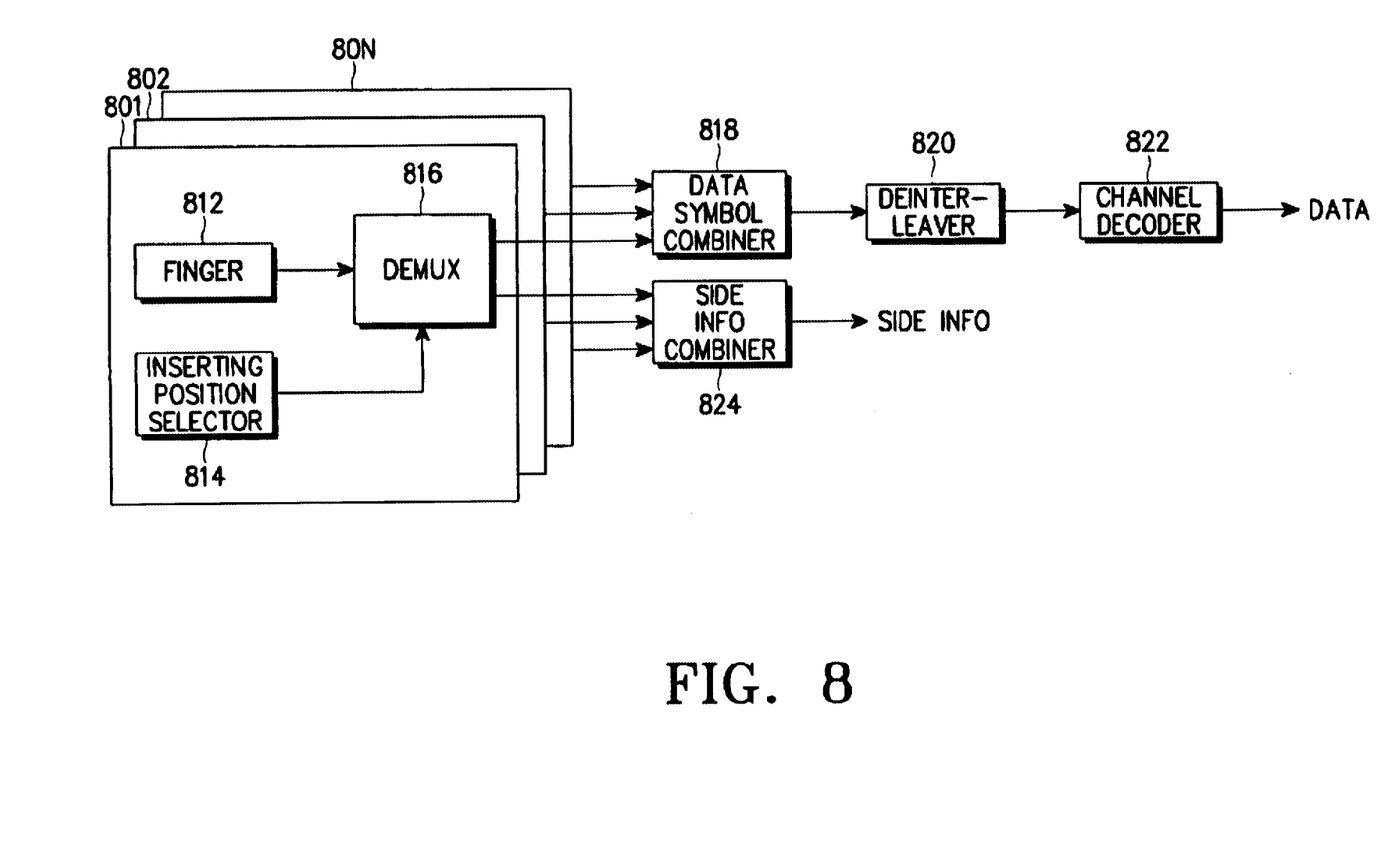
FIG. 8 is a block diagram of a channel receiver in a CDMA communication system according to the present invention.

FIG. 8 illustrates a channel receiver for receiving the data symbols and the side information generated from the channel transmitter shown in FIG. 6 or 7.

Referring to FIG. 8, channel receivers 801 to 80N separate a signal received to each channel into encoded symbols and side information. Each of the channel receivers 801 to 80N includes a finger 812 for despreading a received signal to generate a despread signal sequence, an inserting position selector 814 for designating a position into which the side information is inserted, and a demultiplexer (DEMUX) 816 for separating the side information from the despread signal sequence. A data symbol combiner 818 combines the encoded symbols. A deinterleaver 820 deinterleaves the encoded symbols generated from the data symbol combiner 818. A channel decoder 822 decodes the deinterleaved symbols. A side information combiner 824 combines the side information to supply the combined side information to a side information processor.

Thus, the channel receiver separates the encoded symbols received to each channel into the data symbols and the side information and combines respective ones. The combined data symbols are applied to a data processor through the deinterleaving and channel decoding processes and the combined side information is applied to the side information processor.

As noted above, the channel transmitter punctures not the interleaved symbols but the encoded symbols to minimize the degradation of the channel, and the side information is inserted between these encoded symbols. The side information is periodically inserted at regular intervals or pseudo-randomly inserted.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for inserting side information in a communication system, comprising:

a channel encoder for encoding input data in a frame unit to generate encoded data symbols;

a puncturer for puncturing said encoded data symbols generated from said puncturer as a function of a number of symbols of the side information, the positions of the punctured encoded data symbols chosen such that encoded symbols related to a single information bit are never punctured more than once to lessen a channel degradation by choosing positions that will have the least negative influence during the demodulation process of a receiver;

a side information generator for generating the number of said side information;

a selector for generating a select control signal designating positions into which said side information are inserted;

a side information inserter for inserting said side information between said encoded punctured data symbols in response to said select control signal; and a spreader for spreading the output of said side information inserter.

2. The apparatus as claimed in claim 1, further including an interleaver for interleaving said encoded data symbols to supply the interleaved data symbols to said side information inserter.

3. The apparatus as claimed in claim 2, wherein said side information is a power control bit.

4. The apparatus as claimed in claim 2, wherein said selector generate said select control signal for pseudo-randomly designating a position into which said side information is inserted.

5. The apparatus as claimed in claim 4, wherein said selector generates the least significant bits of a given number of a long code of previous power control group as said select control signal.

6. The apparatus as claimed in claim 2, wherein said selector generates said select control signal for periodically designating a position into which said side information is inserted at preset intervals.

7. The apparatus as claimed in claim 2, wherein upon receiving the select control signal, the side information inserter delays the interleaved data symbols by a delay interval and then inserts the side information into the frame within the delay interval.

8. The apparatus as claimed in claim 7, wherein the side information inserter inputs the delayed interleaved data symbols upon the completion of receiving the select control signal.

9. A method for inserting side information in a communication system, comprising the steps of:

encoding input data in a frame unit to generate encoded data symbols;

puncturing said encoded data symbols, the positions of the punctured encoded data symbols chosen such that encoded symbols related to a single information bit are never punctured more than once to lessen a channel degradation by choosing positions that will have the least negative influence during the demodulation process of a receiver;

inserting said side information between the punctured data symbols; and spreading the symbols with said side information.

10. The method as claimed in claim 9, further including the steps of interleaving said punctured data symbols to generate the interleaved data symbols as the symbols between which said side information is inserted.

11. The method as claimed in claim 10, wherein the number of the punctured data symbols is determined in consideration of the number of symbols of said side information.

12. The method as claimed in claim 11, wherein the number of the punctured data symbols is the same as the number of symbols of said side information.

13. The method as claimed in claim 12, wherein said side information is a power control bit.

14. The method as claimed in claim 10, wherein said side information is pseudo-randomly inserted between said interleaved data symbols.

15. The method as claimed in claim 14, wherein the position of said side information inserted between said interleaved data symbols is designated by the least significant bits of a given number of a long code of previous power control group.

16. The method as claimed in claim 10, wherein said side information is periodically inserted between said interleaved data symbols at preset intervals.

17. The method as claimed in claim 10, wherein upon receiving a select control signal, the interleaved data symbols are delayed by a delay interval and then the side information is inserted into the frame within the delay interval.

18. The method as claimed in claim 17, wherein the delayed interleaved data symbols are inputted upon the completion of receiving the select control signal.

19. A channel transmitter of a communication system, comprising:

a cyclic redundancy check (CRC) generator for adding a CRC bit to input data in a frame unit;

a tail bit generator for adding a tail bit to the output of said CRC generator;

an encoder for encoding the output of said tail bit generator at a preset coding rate;

a puncturer for puncturing symbols of a prescribed number of the output symbols of said encoder, the positions of the punctured output symbols of said encoder chosen such that encoded symbols related to a single information bit are never punctured more than once to lessen a channel degradation by choosing positions that will have the least negative influence during the demodulation process of a receiver;

an interleaver for interleaving the output of said puncturer;

a selector for generating a select control signal designating a position into which side information is inserted;

a side information inserter for inserting said side information between the output symbols of said interleaver in response to said select control signal; and an orthogonal modulator for orthogonally modulating the output of said side information inserter.

20. The channel transmitter as claimed in claim 19, wherein said puncturer puncturers the output symbols of said encoder in consideration of the number of symbols of said side information.

21. The channel transmitter as claimed in claim 19, wherein said side information is a power control bit.

22. The channel transmitter as claimed in claim 19, wherein said selector pseudo-randomly designates the position into which said side information is inserted.

23. The channel transmitter as claimed in claim 19, wherein said selector periodically designates the position into which said side information is inserted at preset intervals.

24. The channel transmitter as claimed in claim 19, wherein said selector generates the least significant bits of a given number of a long code of previous power control group as said select control signal.

25. The transmitter as claimed in claim 19, wherein upon receiving the select control signal, the side information inserter delays the interleaved data symbols by a delay interval and then inserts the side information into the frame within the delay interval.

26. The transmitter as claimed in claim 25, wherein the side information inserter inputs the delayed interleaved data symbols upon the completion of receiving the select control signals.

27. A transceiver of a mobile communication system, comprising:

a channel encoder for encoding input data to generate encoded data symbols sequence;

a puncturer for puncturing a number of said encoded data symbol sequence in consideration of the number of symbols of side information to be inserted, the positions of the punctured encoded data symbols chosen such that encoded symbols related to a single information bit are never punctured more than once to lessen a channel degradation by choosing positions that will have the least negative influence during the demodulation process of a receiver;

an interleaver for interleaving the punctured data symbol sequence;

a side information generator for generating said side information;

a selector for generating a select control signal designating a position into which said side information is inserted;

a side information inserter for inserting said side information between the interleaved data symbol sequence in response to said select control signal;

a transmitter for spreading the data symbol sequence having said side information to transmit the spread signal; and a receiver for receiving said spread signal from said transmitter, wherein said receiver includes;

a finger for despreading said spread signal to generate a receiving signal sequence;

an inserting position selector for generating a control signal designating a position into which said side information is inserted; and a demultiplexer for extracting said side information contained in said receiving signal sequence in response to said control signal generated from said inserting position selector.

28. The transceiver as claimed in claim 27, wherein the number of the punctured symbols is the same as the number of symbols of said side information.

29. The transceiver as claimed in claim 27, wherein said side information is a power control bit.

30. The transceiver as claimed in claim 27, wherein said selector generates said select control signal for pseudo-randomly designating the position into which said information is inserted.

31. The transceiver as claimed in claim 30, wherein said selector generates the least significant bits of a given number of a long code of previous power control group as said select control signal.

32. The transceiver as claimed in claim 27, wherein said selector generates said select control for periodically designating the position into which said side information is inserted at preset intervals.

33. A method for transmitting and receiving data in a mobile communication system, comprising the steps of:

encoding input data to generate encoded data symbol sequence;

puncturing a number of said encoded data symbol sequence in consideration of the number of symbols of side information to be inserted, the positions of the punctured encoded data symbols chosen such that encoded symbols related to a single information bit are never punctured more than once to lessen a channel degradation by choosing positions that will have the least negative influence during the demodulation process of a receiver;

interleaving the punctured data symbol sequence;

generating said side information;

generating a select control signal designating a position into which said side information is inserted;

inserting said side information between the interleaved data symbol sequence in response to said select control signal;

spreading the data symbol sequence having said side information to transmit the spread signal;

despreading said spread signal to generate a receiving signal sequence;

despreading a position into which said side information is inserted; and extracting said side information contained in said receiving signal sequence in response to the designated position.

34. The method as claimed in claim 33, wherein the number of the punctured symbols is the same as the number of symbols of said side information.

35. The method as claimed in claim 33, wherein said side information is a power control bit.

36. The method as claimed in claim 33, wherein said position into which said side information is inserted is pseudo-randomly designated by said select control signal.

37. The method as claimed in claim 33, wherein said position into which said side information is inserted is periodically designated at preset intervals by said select control signal.

38. The method as claimed in claim 36, wherein said position into which said side information is inserted is designated by using the least significant bits of a given number of a long code.

* * * * *